US012737977B2

(12) United States Patent
Chandramouli et al.

(10) Patent No.: US 12,737,977 B2
(45) Date of Patent: Sep. 15, 2026

(54) VIRTUAL REALITY SPECIALIZED PROCESS EQUIPMENT TRAINING SYSTEM AND METHOD THEREFOR

(71) Applicant: Purdue Research Foundation, West Lafayette, IN (US)

(72) Inventors: Magesh Chandramouli, Schereville, IN (US); Ashayla Williams, Merrillville, IN (US)

(73) Assignee: Purdue Research Foundation, West Lafayette, IN (US)

( * ) Notice: Subject to any disclaimer, the term of this patent is extended or adjusted under 35 U.S.C. 154(b) by 203 days.

(21) Appl. No.: 18/806,801

(22) Filed: Aug. 16, 2024

(65) Prior Publication Data

US 2026/0051118 A1 Feb. 19, 2026

(51) Int. Cl.
*G06T 17/00* (2006.01)

(52) U.S. Cl.
CPC .................................. *G06T 17/00* (2013.01)

(58) Field of Classification Search
CPC ..................................................... G06T 17/00
See application file for complete search history.

(56) References Cited

U.S. PATENT DOCUMENTS 5,388,990 A * 2/1995 Beckman ................. G09B 9/08 345/8
9,033,712 B2 * 5/2015 Vasin ................. A63B 24/0006 434/258
9,595,208 B2 * 3/2017 Ottensmeyer ........ G09B 23/286
9,652,893 B2 5/2017 Michail et al.
9,672,757 B2 6/2017 Becker et al.
9,965,973 B2 5/2018 Peters et al.
(Continued)

FOREIGN PATENT DOCUMENTS

CA 3000969 A1 * 6/2014 ............... G09B 5/06
CN 109308739 A * 2/2019 ............ G06T 17/20
(Continued)

OTHER PUBLICATIONS

Nintendo, Super Mario Brothers, 2009, pp. 1-34 (Year: 2009).*
(Continued)

*Primary Examiner* — Cheng Yuan Tseng
(74) *Attorney, Agent, or Firm* — Piroozi-IP, LLC

(57) ABSTRACT

A method of providing a virtual reality training includes presenting a virtual training projection including presenting to the trainee one or more modules associated with operation or assembly of an equipment, for each module presenting a instructions constituting one or more submodules for operating or assembling the equipment, at the end of each submodule, requesting the trainee to repeat the instructions, receiving inputs from the trainee via an input device representing the trainee's virtual actions in repeating the instructions, constructing a trainee action and comparing with an expected action, if within the expected action by a predetermined threshold, then the method includes proceeding to the next submodule, if the trainee action is different from the expected action by the predetermined threshold, then the method includes generating an error signal, and real-time customizing and rendering a new training for said submodule and presenting the new customized rendering to the trainee.

18 Claims, 11 Drawing Sheets

(56) References Cited

U.S. PATENT DOCUMENTS

| | | | | |
|---|---|---|---|---|
| 10,345,768 | B2 * | 7/2019 | Fullam | G06F 3/048 |
| 10,717,001 | B2 * | 7/2020 | Vandonkelaar | A63F 13/5258 |
| 10,810,899 | B1 | 10/2020 | MacGillivray et al. | |
| 10,884,525 | B1 * | 1/2021 | Vonsik | G06F 3/011 |
| 10,901,509 | B2 | 1/2021 | Aimone et al. | |
| 11,045,271 | B1 | 6/2021 | Tran | |
| 11,055,639 | B1 | 7/2021 | Cay et al. | |
| 11,297,164 | B2 | 4/2022 | McCormack et al. | |
| 11,331,803 | B2 * | 5/2022 | Bank | B25J 13/08 |
| 11,347,304 | B2 | 5/2022 | Nguyen et al. | |
| 11,389,248 | B1 * | 7/2022 | Roh | G05B 13/0265 |
| 11,504,051 | B2 | 11/2022 | Krueger | |
| 11,797,093 | B2 | 10/2023 | MacNaughton | |
| 11,872,465 | B2 | 1/2024 | Koblin et al. | |
| 11,928,307 | B2 | 3/2024 | King et al. | |
| 11,935,429 | B2 * | 3/2024 | Van Dinther | G09B 9/00 |
| 12,136,277 | B2 * | 11/2024 | Al-Husseini | G06V 10/751 |
| 12,373,040 | B2 * | 7/2025 | Winters, IV | G06V 20/20 |
| 12,437,670 | B2 * | 10/2025 | Kweon | G09B 19/003 |
| 2004/0224294 | A1 * | 11/2004 | Heininger | A61B 6/00<br>434/262 |
| 2011/0244235 | A1 | 10/2011 | Wildeson et al. | |
| 2012/0264510 | A1 * | 10/2012 | Wigdor | A63F 13/40<br>463/31 |
| 2020/0218767 | A1 | 7/2020 | Ritchey et al. | |
| 2021/0349529 | A1 | 11/2021 | Winold et al. | |
| 2022/0293014 | A1 | 9/2022 | Fisher et al. | |
| 2023/0222940 | A1 | 7/2023 | Sun et al. | |
| 2023/0334788 | A1 | 10/2023 | Zohni | |
| 2024/0028106 | A1 | 1/2024 | Elor et al. | |
| 2024/0071018 | A1 | 2/2024 | Benfold et al. | |
| 2024/0160212 | A1 | 5/2024 | Amer et al. | |
| 2024/0203284 | A1 * | 6/2024 | Lombaerts | G09B 19/003 |
| 2024/0233572 | A1 | 7/2024 | Huang et al. | |

FOREIGN PATENT DOCUMENTS

| | | | | | |
|---|---|---|---|---|---|
| JP | 2021512402 | A | * | 5/2021 | G06F 3/011 |
| TW | 202529065 | A | * | 7/2025 | |
| WO | WO-2022104139 | A1 | * | 5/2022 | G09B 5/06 |

OTHER PUBLICATIONS

Qi et al. (2018). Digital twin and big data towards smart manufacturing and industry 4.0: 360 degree comparison. Ieee Access, 6, 3585-3593.

Lee et al. (2021). All one needs to know about metaverse: A complete survey on technological singularity, virtual ecosystem, and research agenda. arXiv preprint arXiv:2110.05352.

Ullagaddi (2024). Leveraging Digital Transformation for Enhanced Risk Mitigation and Compliance in Pharma Manufacturing. Journal of Advances in Medical and Pharmaceutical Sciences, 26(6), 75-86.

Östlund et al. (2011). 3D visualization as a communicative aid in pharmaceutical advice-giving over distance. Journal of medical Internet research, 13(3), e1437.

Moghtadernejad et al. (2018). A training on: continuous manufacturing (direct compaction) of solid dose pharmaceutical products. Journal of Pharmaceutical Innovation.

Diab et al. (2020). Design space identification and visualization for continuous pharmaceutical manufacturing. Pharmaceutics, 12(3), 235.

* cited by examiner

500

VIRTUAL REALITY SPECIALIZED PROCESS EQUIPMENT TRAINING SYSTEM AND METHOD THEREFOR

STATEMENT REGARDING GOVERNMENT FUNDING

This invention was made with government support under 2213939 awarded by the National Science Foundation. The government has certain rights in the invention.

CROSS-REFERENCE TO RELATED APPLICATIONS

None.

TECHNICAL FIELD

The present disclosure generally relates to specialized process equipment (SPE) training systems and in particular to virtual SPE training systems used in pharmaceutical manufacturing.

BACKGROUND

This section introduces aspects that may help facilitate a better understanding of the disclosure. Accordingly, these statements are to be read in this light and are not to be understood as admissions about what is or is not prior art.

To train a person to assemble and/or operate a piece of specialized equipment in-person presents several challenges. First, in-person training requires making the equipment in question available for the trainee which requires pulling the equipment off its intended environment, e.g., production floor, which results in loss of productivity and thus revenue generated by the equipment. Additionally, one or more instructors have to physically move to the location of training which can be cumbersome and costly. Furthermore, training on real equipment can result in performance-anxiety caused by fear of consequences from incorrect operations and can be hazardous, especially for inexperienced trainees.

Additionally, it may be difficult to gauge how well a trainee has been trained, as written evaluations may sometimes be an inaccurate way of making such a determination. Thus, it would be helpful if there are objective approaches to measure skills-transfer and ascertain whether a trainee is ready for in-person assembly and/or operation of a piece of equipment.

There are many diverse types of equipment, ranging from simply to complex machines. Specialized process equipment (SPE) are used in a variety of different manufacturing areas, e.g., pharmaceutical and bio manufacturing, in various important operations requiring higher level of precision. Many pharmaceutical industries including large, medium, and small scale continue to use conventional training procedures. However, conventional methods are unable to meet the quantity and quality requirements of the pharmaceutical supply chain. The over-reliance on these outdated training procedures was one of the critical factors behind the inability to meet the extremely high demand for essential drugs during the COVID situation.

SPE equipment are expensive and are not easily accessible, as these cannot be pulled out of the production cycle as and when required for training purposes. Furthermore, there are many pharmaceutical operations involving SPE and in addition to initial training, there is a constant need for continuous training as well.

Therefore, there is an unmet and imminent need (as experienced in COVID-like scenario) for a novel methodology to train pharmaceutical operators using a virtual training system, which offers a customizable framework that can be used for multiple SPE training procedures.

SUMMARY

A method of providing training in a virtual reality training room for training a trainee is disclosed which includes presenting to a trainee a virtual training projection (VIC). The VIC includes a virtual robot (VOB) that is configured to guide the trainee in the virtual training. The method further includes executing instructions maintained on a non-transitory memory by a processor to rendering a virtual reality training room scene that includes a specialized processing equipment (SPE) on which to train the trainee, presenting to the trainee an introduction to the VIC, and presenting to the trainee one or more modules associated with operation or assembly of the SPE. For each module: The processor is configured to perform STEP A, which includes presenting a step-by-step initial set of instructions constituting one or more submodules for operating or assembling the SPE, organized by the VOB. The processor is further configured to perform STEP (B) which includes at the end of each submodule, requesting the trainee to repeat the steps covered in said submodule. The method further includes receiving inputs from the trainee via an input device (or multiple input devices), the inputs representing the trainee's virtual actions in repeating the step-by-step instructions, using the trainee's received inputs, and constructing a trainee action including timing of the action and virtual location of the action and comparing the trainee action with an expected action. If the trainee action is within the expected limits of a predetermined threshold, then the method includes proceeding to the next submodule (Step A). If the trainee action is different from the expected action by the predetermined threshold, then the method includes generating an error signal, and real-time customizing and rendering a new training for said submodule and presenting the new customized rendering to the trainee (STEP B).

A virtual reality system for providing training in a virtual reality training room for training a trainee is disclosed. The system includes one or more rendering devices configured to display a virtual training projection (VIC); the VIC includes a virtual robot (VOB) that is configured to guide the trainee in the virtual training. The system further includes one or more input devices configured to obtain inputs from the trainee. Additionally, the system includes a processing system having a processor configured to execute instructions maintained on a non-transitory memory. The processor is configured to render a virtual reality training room scene on the one or more rendering devices; the scene includes a special processing equipment (SPE) on which to train the trainee, present to the trainee an introduction to the VIC, and present to the trainee one or more modules associated with operation or assembly of the SPE. For each module, the processor performs STEP A which includes present a step-by-step initial set of instructions constituting one or more submodules for operating or assembling the SPE, organized by the VOB, The processor further performs STEP (B), which includes at the end of each submodule, request the trainee to repeat the steps covered in said submodule, receive inputs from the trainee via the one or more input devices, the inputs representing the trainee's virtual actions in repeating the step-by-step instructions. Using the inputs received from the trainee, the processor constructs a trainee action including timing of the trainee action and virtual location of the trainee action and compares the trainee action with an expected action. If the trainee action is within the expected action by a predetermined threshold, then the processor is configured to proceed to the next submodule (Step A). If the trainee's action is different from the expected action by the predetermined threshold, the processor is configured to generate an error signal, and real-time customization to render a new training for said submodule and presenting the new customized rendering to the trainee (STEP B).

DETAILED DESCRIPTION

Figure 1A:
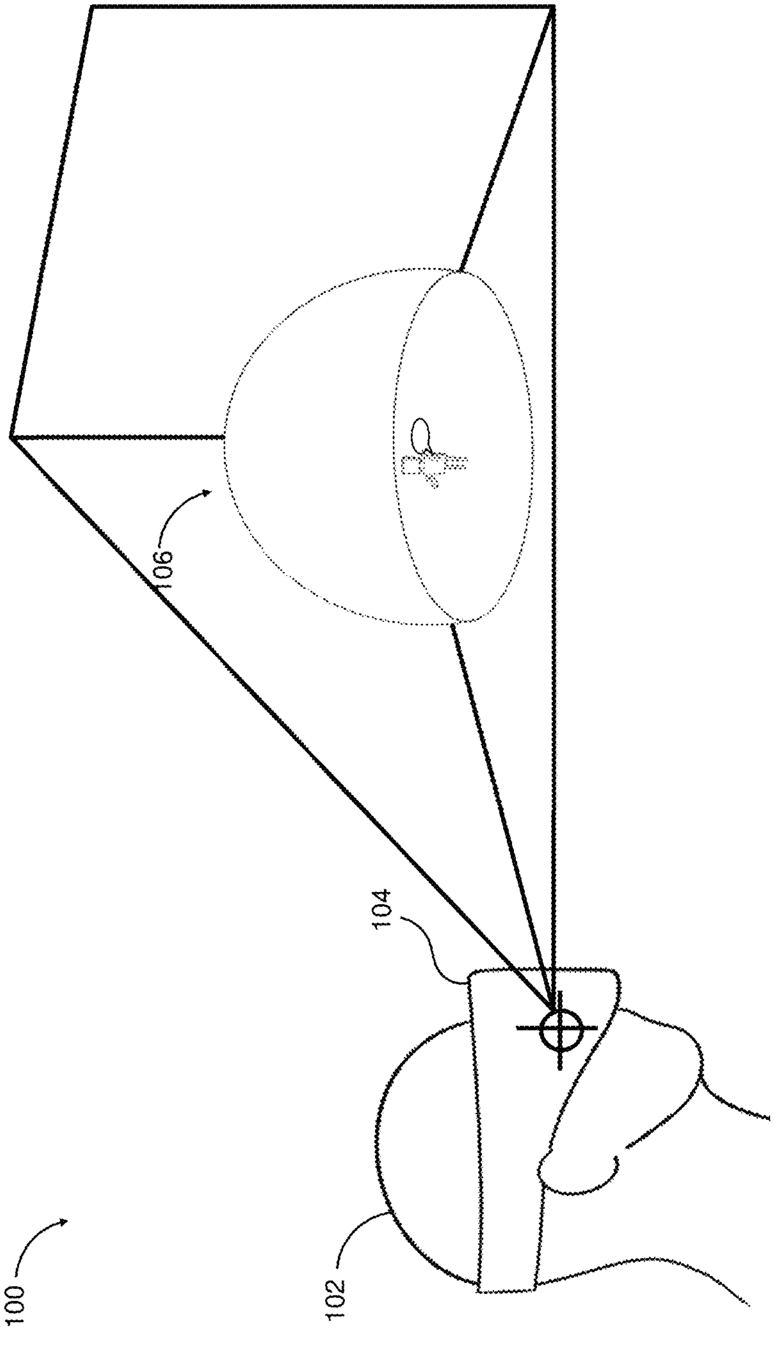
FIG. 1A is a schematic of a general virtual training environment which includes a trainee, a virtual robot (VOB), and a virtual training projection (VIC).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel methodology is disclosed herein to train pharmaceutical operators using a virtual training system which offers a customizable framework that can be used for multiple specialized process equipment (SPE) training procedures used in a variety of different industries, and particularly the pharmaceutical industry. Towards this end, disclosed herein is a Virtual Reality (VR) training framework for training SPE operators. This VR training software offers access to a highly visual, interactive 'digital twin' (DT) of the SPE. The VR training has a critical advantage as relates to trainee engagement and allows connecting to concrete as well as general training concepts. This significantly reduces the cognitive load (e.g., memory, attention) on the trainee and hence improves the training experience.

The virtual framework includes an interactive 3D virtual canvas (VIC) that serves as a one-point entry system to the entire training platform that also includes the digital twin of the SPE. This canvas is configured to allow user customization according to their learning preferences. A Virtual Robot (VOB) with 'contextual-awareness' integrated into this training framework serves as a guide for the trainee throughout the training process. VOB's design is compatible with the smart virtual objects (SVOs) and sensorized voxels and hence can collect data in real-time to understand the context of the user's actions and is able to predict (through data mining) if a trainee needs additional help or assistance. The VOB serves to keep track of the user progress and offers customized information based on the task progress of the user, wherein the context relates to the current position of the user within the virtual training environment. The virtual training further includes the interactive virtual interface component that is configured to provide context-specific information to the user in their preferred mode (textual, visual, audio, interactive).

There are self-assessment modules to enable the trainee to review their learning and retention. The interactive assessment allows the trainee to self-assess their knowledge of the equipment and the processes through guided and non-guided modes. In the guided mode, the trainees use visual and auditory cues as hints, while in non-guided mode, the trainees can perform the assessment without any cues. The guided method further can involve determining, by the virtual assessment modules, customized data based on a scoring system. The system also includes displaying, by virtue of an interactive display, the tailored information to the trainee to facilitate performance of the training tasks.

An overview of the training program according to the present disclosure is divided into 10 steps, provided below. These steps are further described in more detail below and throughout the present disclosure.

1. The trainee begins by choosing between single-user or multi-user modes to determine their interaction with the virtual framework. This framework features the VIC that serves as a central entry point to the entire training platform, including the photo-realistic digital twin of the SPE.
2. After selecting single-user mode using either the VR controllers or, in some cases, the mouse, the trainee is introduced to an intelligent virtual robot assistant, known as the VOB. The VOB guides the trainee through the framework during the entire virtual training process. As the trainee interacts with different parts of the SPE (for e.g. the TFF machine used in this case), the VOB provides tooltips and hints relevant to each component. If the trainee makes an error, such as attaching the incorrect part, the VOB highlights the mistake and provides corrective instructions.
3. The trainee is presented with a brief video tutorial that outlines the goals of the training and demonstrates navigation within the virtual framework. Following the tutorial, they are shown interactive steps that train them in the use the controllers to interact with UI buttons, allowing them to navigate forward or backward or any point in the training as needed.

4. Next, the trainee receives instructions via text, video, and/or audio (according to trainee preferences) to practice interaction with the digital twin using input/output devices, e.g., the handheld controllers to interact with smart virtual objects (SVOs) within the VIC. Guided by the VOB, the trainee learns to operate the VR headset and control it through input devices such as hand-held controllers (HHC), and/or standard devices such as personal computer (PC) mouse, touchpad, and keyboard. Subsequently, the trainee selects the menu button to open a wrist menu and use the grip, trigger, and thumbstick in case of an HHC (or in other cases, e.g., a mouse, mouse actions such as click, hover, and drag) to engage with the selected SVO.
5. After completing the tutorial, the trainee moves on to the operational modules, which include tasks such as assembling machinery components, sub-components, and following procedural workflows. This phase provides access to a highly visual (photo-realistic) and interactive representation of the SPE components, as well as the SVOs, to facilitate a smooth navigation through the virtual learning framework.
6. Each module offers specific information, instructions, and tasks related to the SPE. These are available in both guided (with such as audio and/or textual annotations) and non-guided modes. Trainees can enable or disable these modes by adjusting the settings in the top right corner of the application, or these features can be automatically adjusted based on the trainees' needs.
7. In the virtual workspace, the trainee interacts with virtual objects by selecting, grabbing, rotating, and moving these virtual objects. For example, in assembly mode, the trainee uses an input/output device, e.g., a VR controller, to approach, e.g., a virtual shelf, select a component, and place it onto the main body of a digital twin of the SPE.
8. The VIC and the SVOs are programmed with intelligent-sensing functionalities capable of accurately tracking every user action and this is synced real-time with the input/output device, e.g., the VR controllers, are equipped with sensors that accurately detect and track the user's movements. Guided by built-in data mining functionalities, these sensors ensure that virtual objects respond precisely to user interactions. Owing to the data-mining integration, the VIC is able to predict the subsequent training step customized to suit the trainee's expertise-level as demonstrated in the earlier steps. Data mining algorithms adjust the level and type of guidance based on user performance and behavior. For example, if the user is performing well, the VIC might provide less frequent hints, whereas if the user is struggling, it could offer more frequent and detailed assistance. If the trainee makes an error, such as attaching the incorrect part, the VIC highlights the mistake and provides corrective instructions. For instance, the VIC displays a warning message like, "Incorrect component placement. Try again" . . . and if the error is repeated, VIC displays the message "Click on the VOB help feature". Subsequently, VOB can display video or audio or textual content as well as interactive demo to help the trainee to complete the task. The virtual environment uses physics simulation to mimic real-world forces, such as gravity, collisions (defined further below), and movements, based on the detected actions.
9. Spatial awareness algorithms and gaze-tracking algorithms ensure that objects align realistically in the virtual environment. For instance, objects may snap into place and highlight specific areas when positioned correctly. Actions such as highlighting are triggered by the placement of components in the correct spaces. For enhanced precision, the gaze-tracking algorithm uses the eye tracking input information from the VR headset to follow the movement of trainee's and determine where a person is looking. Tracking where in VIC the user gazes and for how long (duration) offers insights into trainee's progress with the task on hand and also helps estimate user behavior. For instance, during assessment of the component assembly knowledge, when a trainee picks up a specific component and subsequently gazes towards (approximately) the correct area on the main equipment where the component should be placed, it indicates proper understanding. On the other hand, if the trainee gazes at various different parts of the main equipment and keeps on moving the gaze for a longer duration and repeatedly, it indicates that the trainee may need further assistance.
10. Event-driven programming manages the sequence and logic of tasks by responding to specific triggers or events. It ensures that tasks are carried out in the correct order by using events to control the progression from one state to another. For example, when a task transitions from initializing to completed, the system triggers specific actions and provides visual or auditory cues to indicate that the task has been completed.

It should be noted that the virtual assembly or virtual operation of the SPE encompasses all aspects of how the virtual components and environment are presented and interact with the user. These virtual assembly and operation training phases are based state changes triggered in response to user actions, user progress, and predefined triggers (e.g. time lapse, error detection) ensuring a dynamic and responsive training experience.

The trainee begins with a central user interface (UI) description panel and navigation arrows for moving between modules. The VR controllers are integrated to allow interaction with all aspects of the VIC including the UI and all other virtual components. A database having a number of components, in one embodiment 8 components, is programmed so that the component displayed on a table updates dynamically as the trainee cycles through the descriptions. User interactions with all components are tracked in real-time. Once the trainee has completed the interaction with all components, a NEXT button is presented to the trainee to transition to the next module. In order to track the user interactions in real-time the virtual environment uses a voxel structure (e.g., Sparse Voxel Octrees) to efficiently manage spatial data, storing only non-empty space in memory. An octree is a well-known tree-based data structure in which each internal node has exactly eight descendant children. Typically, an octree is used to model a three-dimensional (3D) space. The model is based on recursively subdividing each node into eight octants. Suppose a space is initially viewed as a simple cube. The cube can be initially divided into 8 equi-volume smaller cubes, and then each of these smaller cubes can be subdivided into yet smaller equi-volume cubes. Octrees are commonplace in computer graphics. A voxel is a three-dimensional equivalent of a two-dimensional pixel. The VIC is divided into cubes of equal volume each representing a node, which is the basic unit of the total volume of the 3D virtual space. Using octrees, voxelization converts continuous vector data into a voxel grid representing 3D shapes, using algorithms to maintain connectivity and separability. Sparse voxel octrees are used to efficiently visualize and manage large voxel datasets. Each node in an octree represents a voxel (an axis-aligned cube intersecting surface geometry) that can be subdivided into smaller voxels. The VIC is considered as a super-voxel which represents the topmost parent in the hierarchy of voxels. Combined with the real-time sensing of user actions, the hierarchical structure of the voxel-based arrangement facilitates precise determination of occupied and empty spaces within the virtual environment.

A structure defined by an octree optimizes (conserves) memory usage and maximizes processing power for effective spatial data analysis. Sparse voxel octrees excel in monitoring user interactions in VR games due to their efficient spatial organization and real-time tracking. These octrees enable rapid access to voxel data, essential for smooth VR performance, by focusing on areas with relevant data and ignoring empty regions (areas with no data), thus enhancing performance and rendering efficiency. Their hierarchical octree design, which divides space into smaller sections, allows precise tracking of user movements and interactions, supporting effective behavior monitoring and responsive feedback.

An octree optimizes visibility management by identifying which parts of the scene need to be rendered, reducing computational demands, and boosting immersion. For example, if a trainee interacts with an object in the VIC, the octree quickly determines which areas of the scene are relevant to that interaction and updates only those portions. This ensures prompt updates to the object's state, accurate collision detection (defined as a task of identifying when two virtual objects intersect or virtually touch each other), and realistic feedback adjustments, resulting in a more engaging and responsive VR experience.

In the VIC, a virtual object's state represents the current condition of an object, such as its position, orientation, and all attributes (such as position in the operational sequence, current user-action on this particular object). For example, if a trainee picks up an object, the octree updates its state to reflect this change (positional change in this instance). Collision detection allows detection virtual object interaction and the system correctly identifies and responds to collisions. For instance, if a trainee places a virtual component on a virtual table, the octree accurately detects the collision and simulates the virtual object making contact with the virtual table. This same logic is used to identify if a virtual component is positioned correctly on the equipment during the assembly stage. In the training phases, the system provides realistic feedback adjustments which involve changes to the visual and interactive training aspects of the virtual environment to accurately reflect interactions. For example, if a trainee virtually selects a component of the digital twin (of the SPE), the octree updates the subsequent step to be presented to the trainee by the VIC and this updates visual feedback as well as the subsequent step in the training process to match the updated state of the VIC. Towards this end, the system uses sensorized voxels, which incorporate data from input/output device sensors to monitor critical interaction zones. That is, sensorized voxels are voxels near critical areas, e.g., a particular location on virtual components of a digital twin of an SPE, positioned such that when the trainee uses an input/output device to move a component near that voxel, these sensorized voxels detect actions such as proximity and interactions with virtual component. Sensor data from each voxel is processed in real-time, thus updating the virtual 3D environment of the VIC continually.

In various training modes during the actual training process, e.g., virtual component demo mode, cubic voxels embedded within the virtual scene are programmed to capture user actions. These sensorized voxels have embedded sensors that capture interaction data continually (in real-time). The system which manages the VIC collects and processes this voxel data in real-time to update each voxel's state, including changes in position, orientation and any other interaction status. When a voxel's state is updated, the system immediately reflects the user's actions as real-time feedback. For instance, if a trainee virtually picks up a virtual component, the voxel grid's visual and interactive elements are updated to match the virtual object's new status (i.e., "selected", "interacted with", "active/inactive", etc.). This visual feedback is also programmed to communicate to the VOB, which provides guidance or feedback through text, audio, and annotations within the virtual environment. The feedback system dynamically adjusts by continuously analyzing real-time data from user interactions, including data from voxel sensors and other components in the VR environment.

Starting with the component demo mode, the trainee begins with a central UI description panel and navigation arrows for moving between virtual components. The input/output devices, e.g., VR controllers, allow interaction with both the UI and the virtual components. A database of virtual components, e.g., 8 virtual components, is programmed so that the virtual component displayed on a virtual table updates dynamically as the trainee cycles through the descriptions. User interactions with all virtual components are tracked in real-time. Once the trainee has completed the interaction with all the virtual components, a "NEXT" button is enabled to transition to the next module.

The following steps occur when tracking user input data, scene interaction data, changes in state of the VIC:

1. Data Collection: Input/out device sensors, such as VR controllers and head-mounted displays (HMDs), collect updated information about the voxel, including its current state and interaction status. In a sparse voxel octree, this data pertains specifically to areas of the scene that are being interacted with or have changed.
2. Data Processing: The sparse voxel octree processes new data, recalculating the voxel's properties including all spatial data (position/orientation) and the states (active/inactive). Its hierarchical design enables efficient management and updating of only the relevant sections of the voxel grid, reducing computational load.
3. Feedback Generation: The voxel's interactive status is logged based on the user's interactions. This feedback is used in two ways: what needs to be presented to assist the user is displayed to the trainee; the part that is used to determine user progress is not displayed to the user, but it serves as the input to generate the next training step.
4. Communication Interface: The updated voxel data is sent to other components or systems, such as a rendering engine or the VOB, ensuring that the changes are accurately represented in the virtual environment.
5. Feedback Integration: The receiving systems (i.e., any component that processes, utilizes, or acts upon the updated voxel information) incorporate the updated voxel data into their functions. For instance, the VOB provides real-time feedback, while the rendering engine updates the visual representation to accurately reflect the voxel's new state (highlights a component that has been interacted with). This visual feedback is also programmed to communicate to the VOB, which provides guidance or feedback in the form of annotations (text and/or audio), video, and brief virtual interaction. The feedback system dynamically adjusts by continually analyzing real-time data from user interactions, including data from voxel sensors and other components in the VR environment. For example, and in concert with the steps provided above, when a trainee moves a virtual component, the following steps take place: 1) Data Collection: Sensors detect the updated location and orientation of the component. 2) Data Processing: The system updates the component's spatial attributes (position/orientation) and its current state (active/inactive, reflecting if it is being currently interacted with). 3) Feedback Generation: The component's visual appearance is updated to show it has been moved (e.g., highlighted, or glowing). 4) Communication Interface: This updated visual information is sent to the VOB. 5) Feedback Integration: The VOB adjusts its guidance or instructions to reflect the component's new position, which may include updating text on-screen or providing new verbal instructions.

Once the initial instructional modules are completed, subsequent operational modules are carried out based on the following steps: 1) the system continues to monitor user interactions and updating voxel states in real-time using sensorized voxels and sensors on the input/output devices 2) The system assesses the updated voxel data to evaluate the current state of the VIC and the trainee's actions, continuously monitoring any changes. For instance, how the virtual environment has changed based on recent interactions. 3) Decision-making algorithms, such as rule-based logic (using predefined criteria) and gaze-tracking are used to determine the next appropriate action. For example, the rules might specify that completing a task triggers the system to show the next task or give feedback to the trainee if the task was not completed appropriately. Rules defining criteria for appropriate task-completion are programmed into these decision-making algorithms (e.g. following correct order assembling sub-components to complete a process or a sub-process). 4. For feedback, the next steps are communicated to the trainee by altering what the trainee sees on their screen or VR display to provide new instructions or guidance. For example, user interface updates with visual cues, text instructions, or audio prompts. These feedback ensure that the guidance matches their current progress. 5. Lastly, feedback on the trainee's responses (user interaction log) is recorded and adjustments are made for future steps. Thus, a real-time customization is accomplished by tracking training activity via intelligent agents in real-time through sensorized voxels. This enables continuous VIC state monitoring, and corresponding to signals from the input/output devices, allowing the system to interpret this collective data to analyze user actions and generate commands and new scenes in real-time. Towards the real-time customization, a structured process is followed: 1) Trainee actions are monitored continuously through sensorized voxels, input/output devices and a tracking system utilizing the octree. This data is analyzed within the framework and by system, which assesses the trainee's interactions and progress within the virtual environment. 2. Based on this analysis, the VOB generates and executes commands to adjust the training experience in real-time. This real-time command generation include offering additional guidance or altering task complexity (increase or decrease the number of steps required to complete a task) based on the trainee's performance. 3. These adjustments are reflected in real-time within the training environment through updates to the user interface and feedback mechanisms, such as visual cues, text, and/or audio instructions.

After the successful completion of each virtual training module, the trainee interaction includes selecting the "Next" button to observe an animated process of the SPE. The VOB is located at a specific position, e.g., on the right-side corner of the VIC, to offer instructions to the user if needed. The process is highlighted as: 1. Trainee actions are monitored continuously through sensors, controllers, and tracking systems. This data is analyzed within the framework and by the system, which assesses the trainee's interactions and progress within the virtual environment. 2. Based on the analysis of the trainee's performance, the system makes real-time adjustments to the training experience. For instance, it might instruct the trainee to click the "NEXT" button to proceed or offer options to skip certain animations if they are not needed. Additionally, the system offers smart guidance to the trainee by providing visual cues, such as VOB pointing to specific components and highlighting specific areas in the VIC to make them more noticeable. 3. These adjustments are implemented in the training environment by updating the user interface and feedback mechanisms, which include visual indicators and audio instructions, ensuring that the trainee receives immediate and relevant guidance. 4. The system collects real-time data from all the input sources (some users may choose to use HHCs along with mouse, keyboard, etc.). The other input data involved in the process includes the duration of task completion (time), the trainee's position within the virtual environment (location), and how they interact with virtual elements (user interaction such as click, drag, hover, etc.). 5. This data is analyzed in real-time to assess how quickly and accurately the training tasks are completed. 6. Decision-making algorithms process the analyzed data to determine the most suitable next task or action. For instance, if a trainee consistently performs well, the system takes them to the next level or introduces a more complex task. On the other hand, a trainee may face some challenges such as taking longer than usual time or continuing to incorrectly assemble components after multiple attempts. In such cases, the system offers additional guidance (i.e. help from VOB) or introduces simpler tasks (for example, re-introducing an earlier step or presenting a simpler breakdown of the sub-components to prepare them better for the step that is causing learning challenges). 7. The user interface and feedback mechanisms are updated to present the new task, which may include visual cues, updated instructions, or audio prompts. 8. After each task, the system collects feedback on their performance and uses this feedback to refine future steps. This continuous feedback loop enables real-time adjustments, providing a personalized and responsive training environment that evolves in real-time with the trainee's progress.

Component Identification Mode (CIM) is another mode of high criticality in the virtual training framework. This mode is an interactive training and assessment mode designed for trainees to evaluate their knowledge of the SPE. In this mode, the trainee is presented with the digital twin of the SPE at the center of the virtual scene and the two virtual shelves on either side. The rows on the left-shelf display all the virtual components of the SPE and the rows on the right-shelf have labels (showing component names). The goal is to correctly match each component from the left shelf to the appropriate label on the right shelf. To track the trainee's performance in this task, a voxel-based structure is employed as explained here: 1) The VIC serves as the top-level parent object in the voxel hierarchy. Within the VIC, cubic voxels are strategically placed in key interaction zones such as the shelves, the central user interface (UI), and the DT of the equipment. Areas where these components are located are referred to as non-empty space. 2. Each voxel in these key zones is equipped with sensors that monitor and collect interaction data at regular intervals. This data collection occurs continually and allows real-time update of each voxel's state. For instance, when a voxel's state is updated, the system immediately adjusts the visual and interactive feedback to reflect the user's actions. If a trainee picks up a virtual component from a virtual shelf, the visual feedback will show the virtual component being lifted, and when it's placed elsewhere, the display will update to show the new position of the component. This new position, in turn, is used to evaluate the trainee's understanding depending on the accuracy of the component placement. If the trainee clicks on a button or virtually interacts with an object, the system will ensure that the corresponding actions or options become available. These actions or options are 'context-sensitive', which implies that the options displayed are not exactly the same for all components, but are dependent on the specific component or the specific action performed by the trainee. For instance, some components may have high or critical safety implications and may require specific processes to be stopped before switching them from one state to another. In such instances, a mandatory safety module will be presented in the context-sensitive information menu. The VOB will instruct the trainee about the special safety aspect of this component to update the trainee and ensure strict compliance of the safety adherence protocol. 3. Smart voxel detail management is accomplished through the implementation of Levels of Detail (LOD) algorithm. Obtaining real-time voxel information from all voxels while rendering the entire 3D scene in high photo-realistic details is not required at all times during the training. At any given point of time, the trainee is working with specific components or processes within the virtual training. High LODs provide detailed rendering for objects that are close to the user, while lower LODs offer less detail for distant objects. For example, the virtual shelves might use smaller voxels with bounding boxes to render visual and spatial data, while the area around the DT may only collect spatial data without detailed rendering. 4. In the Component Identification Mode, when a user selects a virtual component from the virtual left shelf and places it onto the correct label on the virtual right shelf, the entire interaction is tracked. This process captures and records only the relevant data, such as the movement of the component and its interaction with the labels. Additionally, collisions, or interactions between the user and the voxel structure, are detected and analyzed to ensure accurate feedback and system response. 5. Visual feedback is integrated with the VOB, which provides real-time guidance through text, audio, and annotations within the VIC. For example, if a trainee correctly identifies and places a component, the VOB may provide a congratulatory message and take the trainee to the subsequent step. If the trainee performs an incorrect maneuver, then additional guidance will be offered to complete the current step before proceeding further. 6. The feedback system dynamically adapts by continuously analyzing real-time data from user interactions, including information from voxel sensors embedded within the virtual environment. For instance, if a trainee virtually moves a virtual object, the system updates the feedback to reflect this action, such as changing the virtual object's color or providing updated instructions.

Continuous state monitoring (CSM) is another critical element of the system. CSM information from all sensorized voxels is continuously relayed to the system. It should be noted that at some point of time, not all voxels may undergo change in state. Thus, only voxels which undergo change contribute to the overall change in state of the VIC. For instance, if a virtual component is moved from a virtual shelf, the sensorized voxel at the original component location detect and report this change. This voxel's update will be sent to the system, which processes the information to reflect the component's new status in the virtual environment. Importantly, for optimal system efficiency and quicker response time, only the voxels that register changes contribute to this update, while those unaffected by the movement do not participate in the process.

Movement detection represents another critical aspect of the system. Movement detection is based on: 1. Continuous monitoring of the virtual environment by spatial awareness algorithms: When a component is moved from a shelf, the sensorized voxel at the original location of the embedded sensorized-voxel within the component detects this change. For example, if the component is removed, the sensors detect the absence of the component through the change in the voxel's data. 2. Change detection and reporting: The sensors generate data indicating that a change has occurred. This data typically includes the type of change (e.g., removal of a component) and the exact time or displacement as a result of the change. 3. Data Transmission: The updated information is then communicated from the sensorized voxel to the VIC 4. VIC Analysis: Upon receiving the updated data, the VIC processes the information (e.g., component's removal) and updates the virtual environment accordingly. This may include adjusting the virtual and visual representation of the component's new status (e.g. highlighting its location with a glowing effect to draw show correct assembly). 5. As discussed above, for optimal performance of the VR framework, only voxels that have registered changes are considered when updating the VR framework. If other voxels, which are not affected by the virtual movement of the virtual component, do not report any changes, they are not included in the update process. Only relevant data is processed to ensure optimal framework performance and accuracy. 6. The virtual environment is updated based on the processed information. For instance, the area where the virtual component was removed might now show an empty space. Interactive elements related to the component might also be enabled or disabled as necessary. The same can be applied to visual, auditory, and haptic (tactile) feedback.

As trainees interact with the virtual environment, the system continuously tracks their actions and updates the scene objects accordingly. For example, if a trainee moves a virtual object, the system detects this change through voxel-based structures that monitor the object's position. Again, only those voxels that register changes are involved in this update, while unaffected voxels remain unchanged and do not contribute to the process. This updated data is transmitted to the VIC. Based on the collected data, the system generates real-time feedback to provide immediate responses to the trainee's actions. For example, highlighting the virtual object being manipulated to make it more noticeable; auditory feedback may include issuing a proximity warning when the trainee enters a low Level of Detail (LOD) octant, which signifies a less detailed rendering area; or haptic feedback, such as providing vibrations or resistance in the VR controllers to simulate improper collisions with virtual objects. This multi-modal feedback ensures that the trainee receives clear, immediate, and relevant responses to their interactions, enhancing the overall immersive experience.

Examples of feedback may include: Visual feedback (e.g. highlighting, arrows, etc.), wherein when a trainee virtually moves a virtual component from one virtual shelf to another, the system immediately highlights the new position of the virtual component with a glow effect or animated transition. This visual cue ensures that the trainee can clearly see where the virtual component has been placed, making it easier to follow instructions and understand the current state of the scene. Auditory feedback, wherein when the trainee virtually moves closer to an interactive element, such as an object of interest, the system emits an audio cue or a voice-alert. For instance, if the trainee approaches a high-priority item, a distinct sound may signal the item's importance or readiness for interaction. This auditory feedback helps the trainee focus on relevant objects and actions, enhancing awareness. Haptic feedback: wherein when the trainee interacts with a virtual object, the system provides haptic feedback through the VR controllers. For instance, if the trainee virtually picks up a virtual object, the input/output devices may simulate its weight, while if the object drops, they may mimic the sensation of gravity. This feedback provides the trainee with a realistic sense of the object's physical properties, enhancing the realism of the interaction.

Figure 1B:
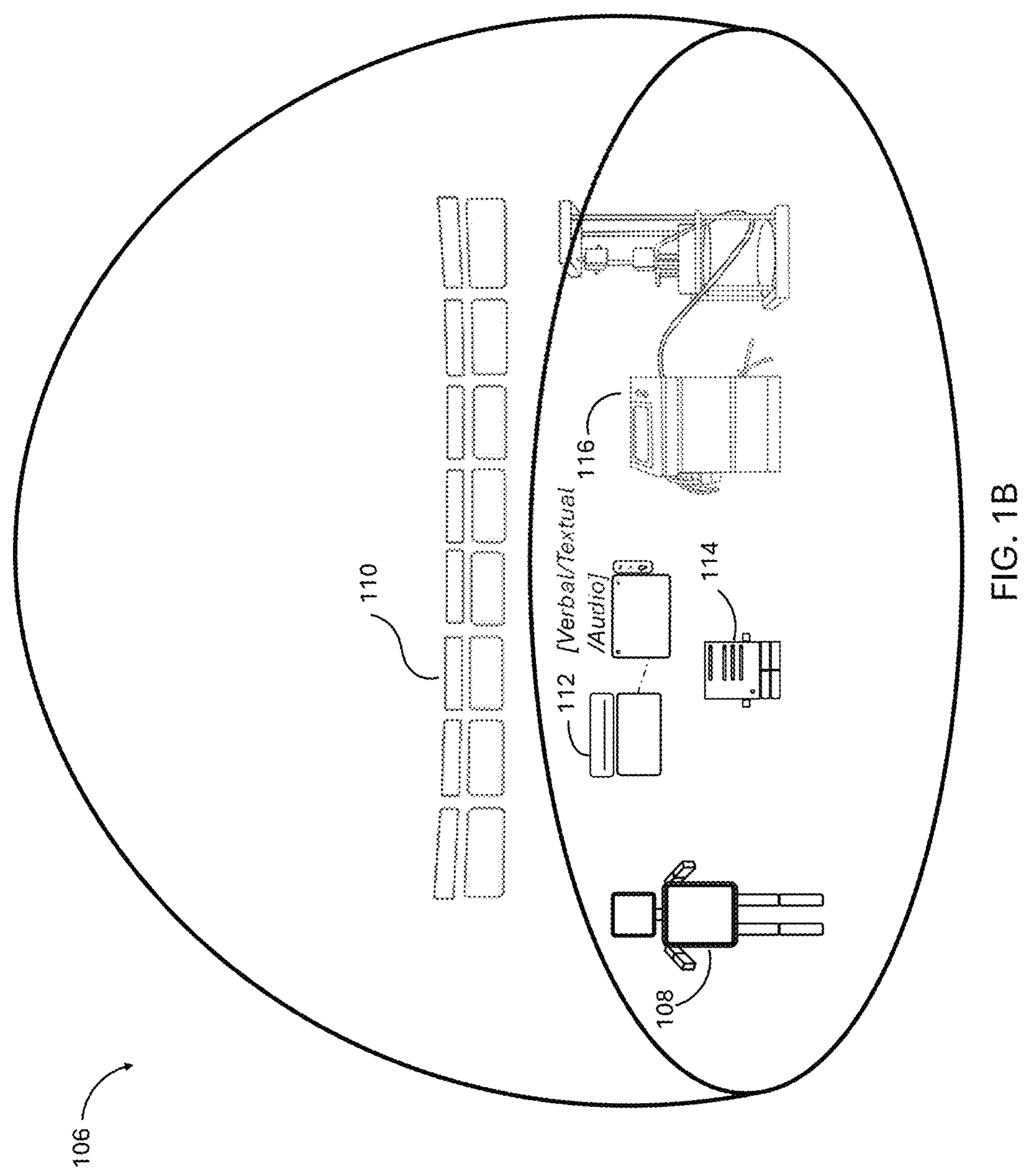
FIG. 1B is a schematic of the VIC of FIG. 1A which includes the VOB of FIG. 1A that guides the trainee of FIG. 1A in the training process.

We now turn our attention to specific implementations of the system. Referring to FIG. 1A, a general virtual training environment 100 is provided. The virtual training environment 100 includes a trainee 102, wearing a virtual headset 104 which provides a training projection 106 in which the trainee 102 is virtually trained. The virtual headset 104 is one such input/output device that the trainee 102 uses to interact with a processing system having a processor configured to execute software stored in a non-transient storage unit to achieve the methods described herein. However, a handheld controller, a keyboard, a mouse, a touchpad, a monitor, and other known input/output devices to a person having ordinary skill in the art may also be used to provide input to the processor which then effects the virtual training environment presented to the user. An example of the virtual training projection (also referred herein as VIC or 3-dimensional canvas, or 3D canvas) 106 is provided in FIG. 1B. The VIC 106 can present, via multiple interface components discussed above, all the information associated with the parts that need to be assembled as well as the different parts of the SPE. The VIC 106 is configured to provide a one-point entry system to the entire training platform that also includes a digital twin of the SPE. However, it should be appreciated that what is shown in FIG. 1B is but one example of what may appear in the virtual training projection 106. Referring to FIG. 1B, the virtual training projection 106 includes a virtual robot (VOB) 108 that guides the trainee 102 in the training process. The VIC 106 provides a 3D interactive canvas that allows the trainee to access information in a customizable manner about the parts needed to assemble the SPE, various parts of the SPE, various processes, various component interactions, curing of different parts of the training program via visual feedback, auditory feedback, and tactile feedback (e.g., through the handheld controller). The parts of SPE that need to be assembled are presented to the trainee 102 as smart virtual objects (SVOs). Each SVO represents a component (part) of the SPE. A trainee 102 can choose an SVO (e.g., by clicking a mouse, or providing feedback via the virtual headset 104 to access all required information pertinent to the component with respect to the overall equipment operating procedure. A number of tasks 110 are presented in the virtual training projection 106, which the trainee is asked to choose and perform the training therefor. For each training task, the contents of the virtual training projection 106 may change to accommodate the details of that specific training task. Additionally, there may be clips 112 including verbal, including textual, audio, and video clips provided within the virtual training projection 106 to further guide the trainee 102 in navigating the training. Additionally, the virtual training projection 106 may include other items such as a bin 114 and an SPE 116.

The VOB 108 is the guide for the trainee 102 during the training session. The VOB 108 interacts with the trainee via the virtual headset 104, a handheld controller 130, or as discussed above, other input/output devices. The VOB 108 is a user-friendly guide in the virtual framework who is available throughout the training process to serve as a handy help for a trainee 102, including to help the trainee 102 understand what to expect next. The VOB 108 offers visual, audio, and other cues to the trainees by changing colors, shape/form, and displaying messages to offer friendly help, current status, and any warning messages, etc. This approach offers enhanced delivery of the training content that allows advanced customization to enhance the learning experience. A trainee 102 using the VIC 106 tend to be highly engaged and proactive in their learning. Through the increased interactive nature of this form of training, learners gain improved retention and spatial skills for achieving a task. The interactive training allows the trainee to explore the connections between actions and outcomes, build schemas, and develop detailed mental models of the task; necessary factors for achieving high levels of situation awareness (proprioception), decision making, and task automaticity. Based on the trainee's performance, the VIC dynamically adjusts the difficulty of tasks. If the trainee is having trouble (taking more time, assembling wrong component, etc.), the VIC offers more detailed instructions and additional hints. If the trainee excels, the VIC presents more complex tasks to challenge them.

Figure 1C:
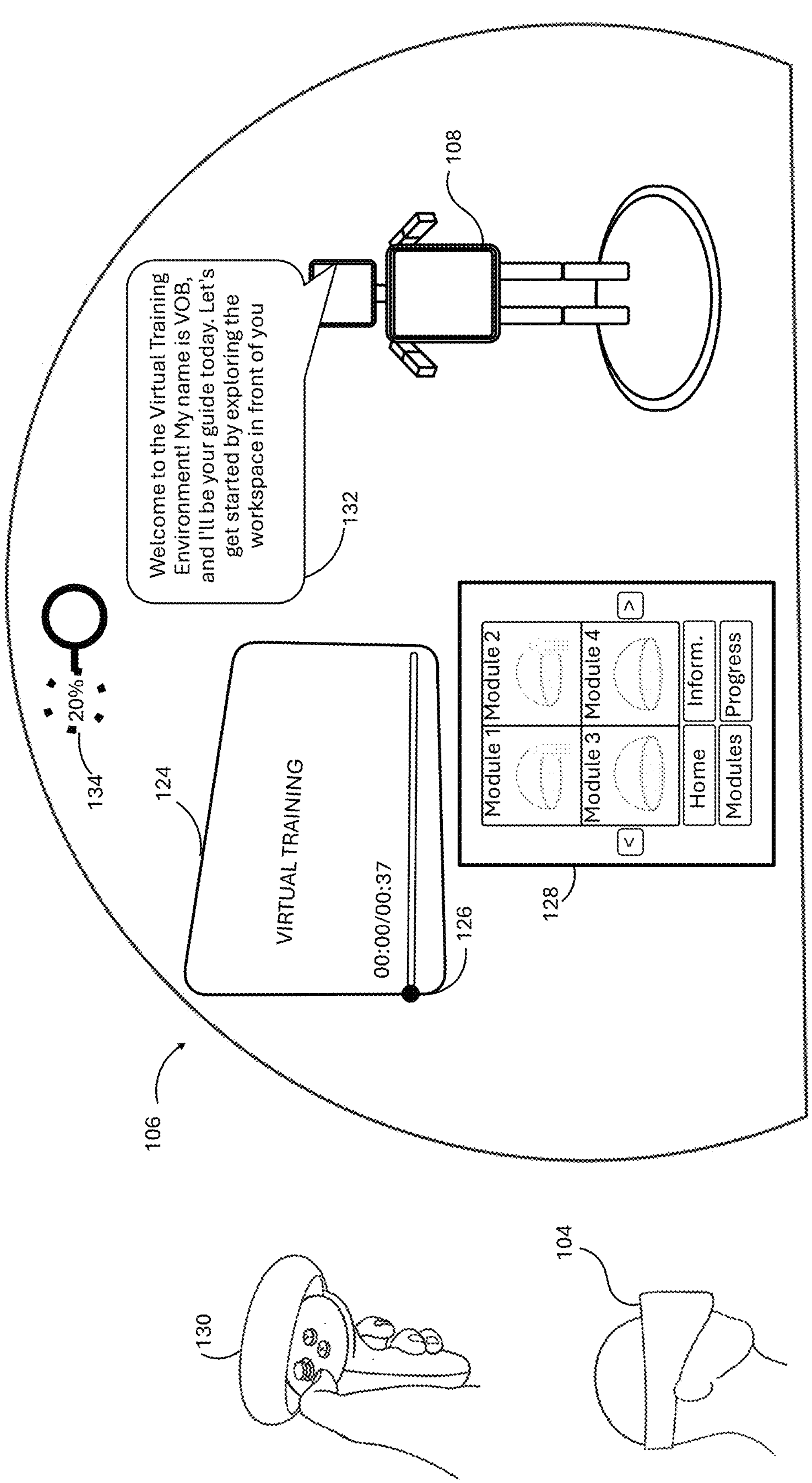
FIG. 1C is an example of the VIC of FIG. 1B as seen and interacted by the trainee of FIG. 1A via a virtual headset or a handheld controller, known to a person having ordinary skill in the art.

Referring to FIG. 1C, an example of the VIC 106 is shown as seen and interacted by the trainee 102 via the virtual headset 104 or a handheld controller 130, known to a person having ordinary skill in the art. The example scene of VIC 106 in FIG. 1C provides a virtual training screen 124 on which the trainee 102 can virtually see a training program with a virtual progress meter 126 according to which the progress of the trainee 102 is displayed. The training program virtually displayed on the virtual training screen 124 is chosen from a menu 128 which virtually displays which modules are available to the trainee 102 with virtual navigation buttons that can be chosen by the handheld controller 130 or by the virtual headset 104 by the trainee 102. The VOB 108 provides messages 132 to interact and guide the trainee 102. In addition to the virtual progress meter 126 displayed on the virtual training screen 124, a global progress meter 134 is also displayed in the VIC 106 showing how far the trainee has progressed. The training module adapts the scenario based on the trainee's actions. For example, if the trainee successfully completes a task, the VIC transitions to a new scenario that builds on the previous one, such as troubleshooting a machine malfunction.

Figure 2:
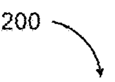
FIG. 2 is a flowchart that describes a method for training customization, according to the present disclosure.
Figure 2:
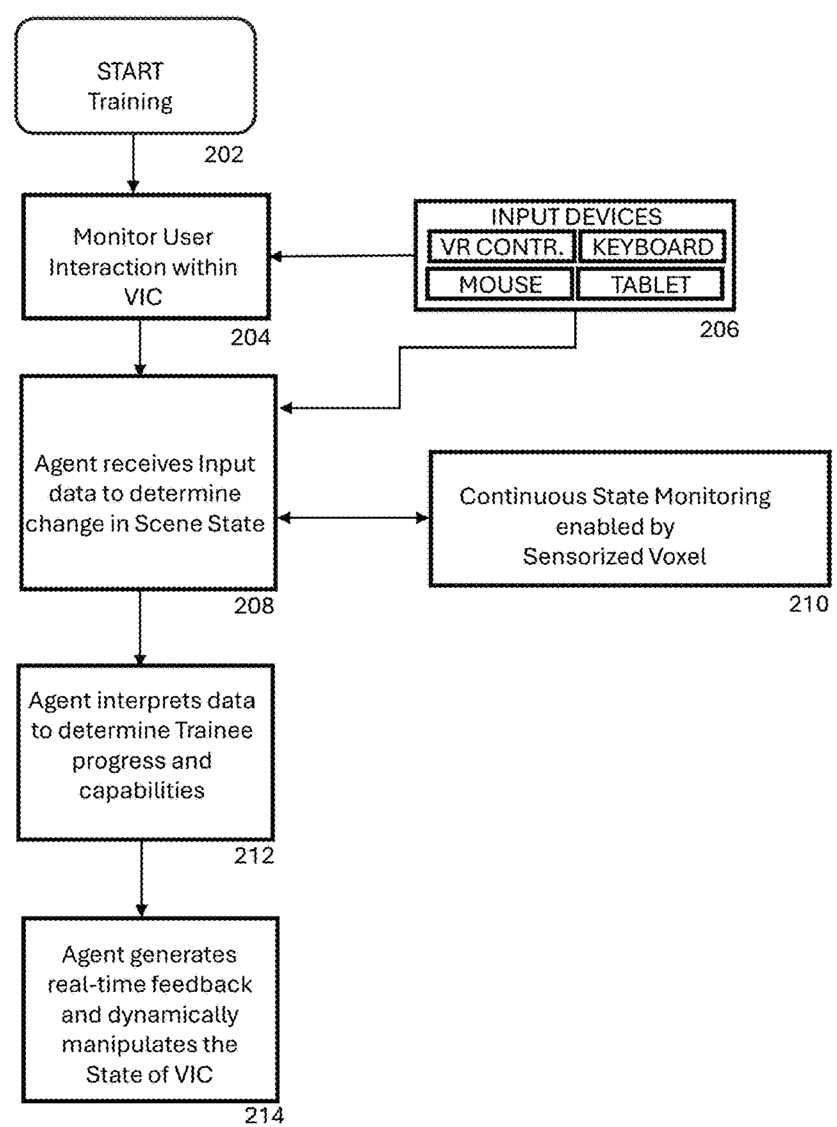

A major innovation in the system and method of the present disclosure is the customization of the training program for each individual trainee 102 based on his/her expertise, progress, time to finish each module, and accuracy in completing each module. The training customization is described by a method 200 provided in the form of a flowchart found in FIG. 2. The method initially begins with an initial state 202 where the trainee 102 begins his/her training. The method 200 is based on software that is held in a non-transient memory and executed by a processor. The software monitors user interactions with VIC 106 (i.e., by monitoring inputs provided by the trainee 102 via one of the input/output devices, e.g., the virtual headset 104, as indicated by blocks 204 and 206. When input is recognized and received from the trainee 102, the input is provided to a concurrently running software that constitutes the VOB 108, identified in FIG. 2 as an agent. The agent monitors changes in state of the VIC 106 via a sensorized voxel, discussed more fully below, as provided by blocks 208 and 210. Once the agent has received data from the sensorized voxel, indicating a change in the state of the VIC 106, the agent determines progress and capabilities of the trainee 102, as provided by block 212. Thereafter, the agent generates real-time feedback in the form of dynamically manipulating the state of the VIC 106, as indicated by block 214.

Figure 3:
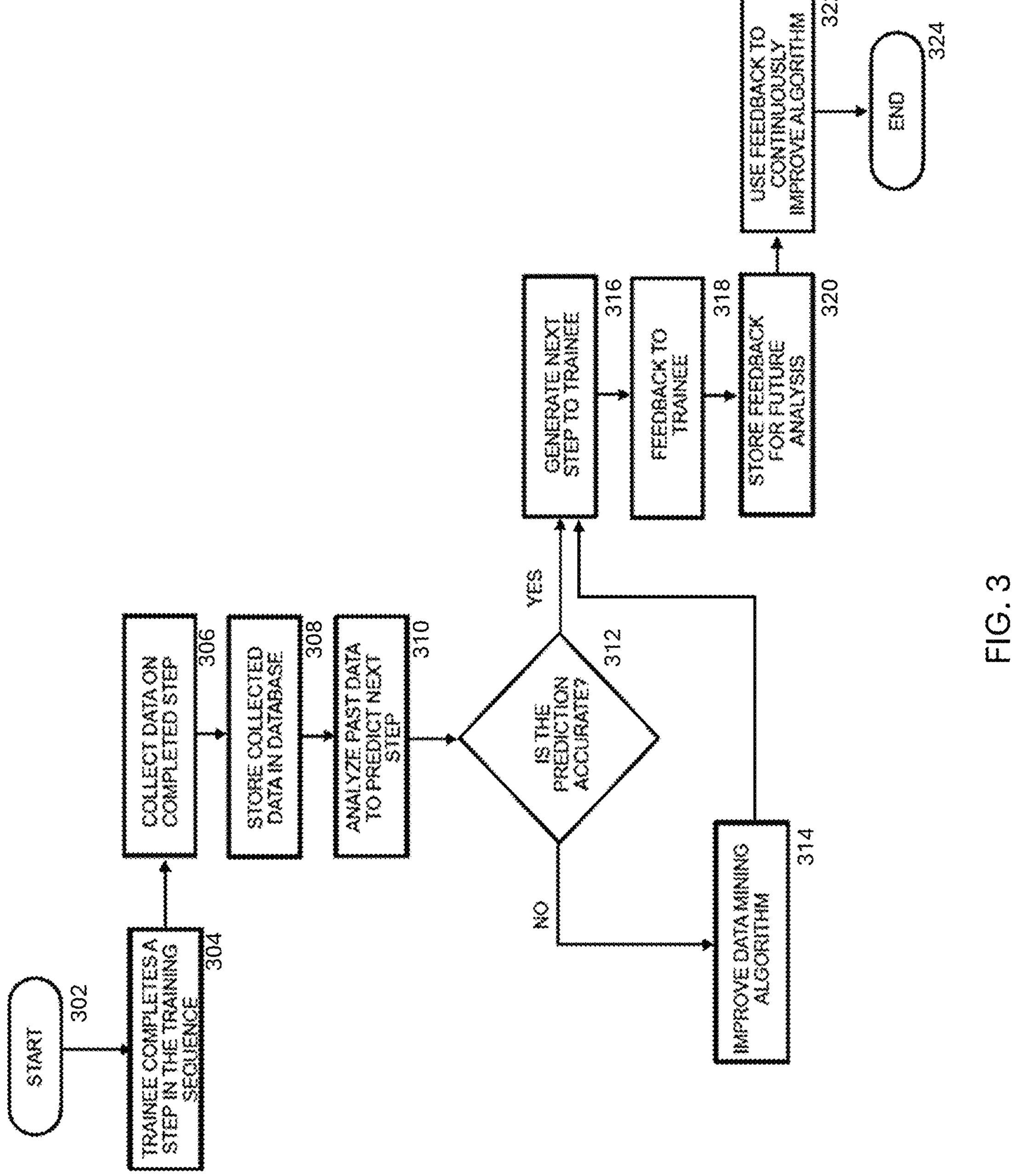
FIG. 3 is a flowchart that provides a more detailed version of training customization method shown in FIG. 2.

Referring to FIG. 3, a more detailed version of training customization method 300 is provided in the form of a flowchart. The flowchart starts at block 302. The VOB 108 (i.e., agent) monitors changes in state of the VIC 106 via the sensorized voxel, discussed further below, and determines that the trainee 102 has completed a next step in the training, as indicated by block 304. Utilizing the changes in state of the VIC 106 information provided by the sensorized voxel, the agent collects data associated with the completed step by the trainee 102, as provided in block 306. This collected data is then stored in a database, as provided in block 308. This collected data is then compared to past data as it relates to other trainees or predetermined actions, as provided in block 310. That is, in the database, the step taken by the trainee 102 as provided in block 304 is compared with a predicted step that exists in the database. For examples, if the trainee 102 is predicted to take a certain step based on past knowledge (acquired from other trainees' actions) or based on predetermined actions, and this predicted step is stored in the database, the action of the trainee 102 determined in block 304 is compared with the predicted action in decision block 312. If the comparison results in the negative, i.e., the predicted action is different than the action performed, an error signal is generated, which can alter the next scene in VIC 106, as provided in blocks 314 and 316. If the predicted action matches the action performed by the trainee, i.e., the comparison results in the positive, then a next scene as exists in the database is presented, as provided in block 316. The agent may also provide feedback to the trainee 102, as provided in block 318. The feedback may be a confirmation that the trainee took the correct action, or that the trainee took an incorrect action. In case of an incorrect action performed by the trainee, i.e., the comparison in the decision block 312 results in the negative, the next scene as provided in block 316, may be a return to the scene that was initially presented for this step of training, an intermediate scene, or a scene altogether different depending on the error signal associated with the difference between the actual action taken and the predicted action. The feedback provided to the trainee 102 is stored in the database associated with the particular task, as provided in block 320. The stored feedback is then used to improve the training customization, as provided in block 322. The method 300 then ends at block 324.

Figure 4:
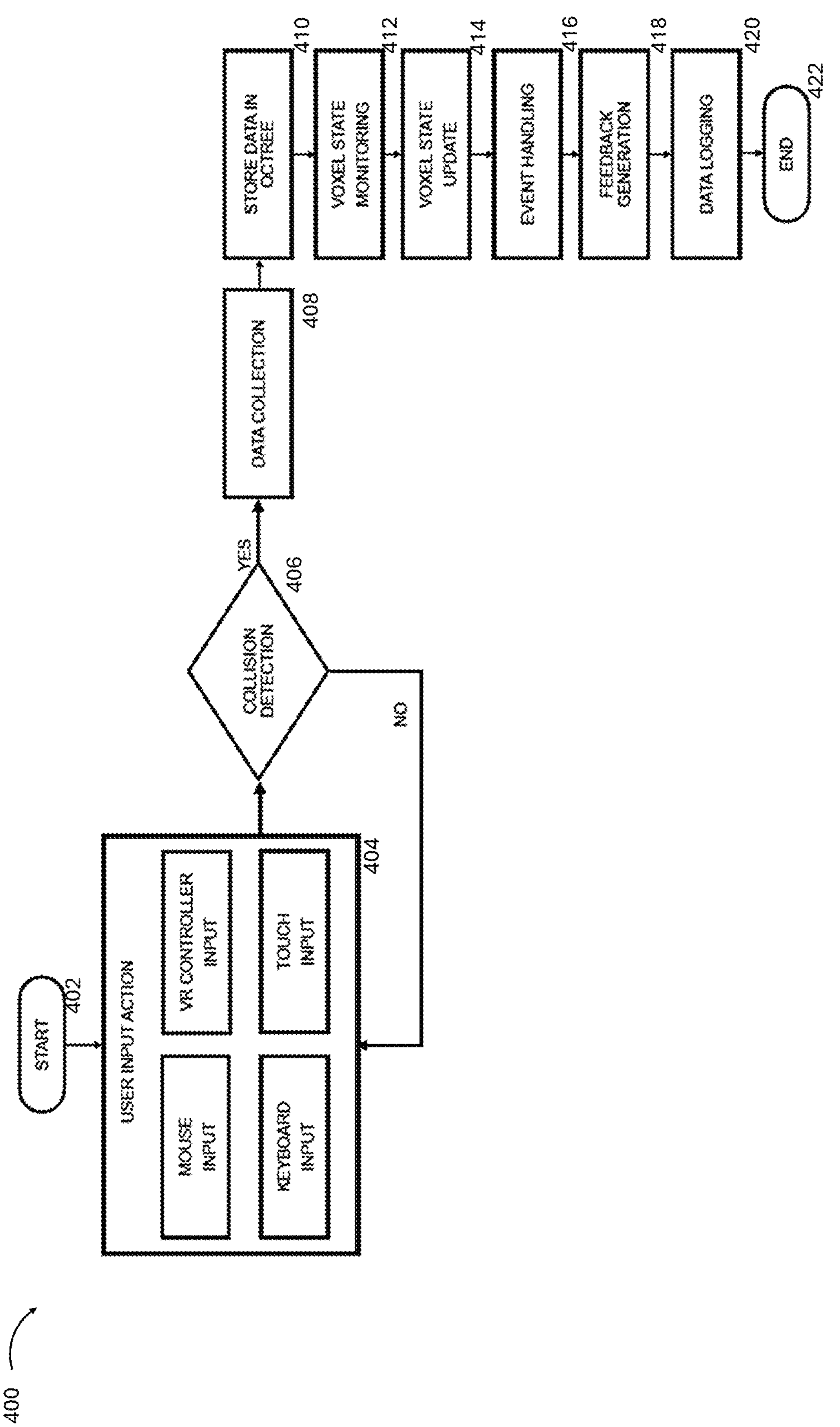
FIG. 4 is another flowchart describing the method related to training customization, according to the present disclosure.

Referring to FIG. 4, a method 400 related to training customization is shown in the form of a flowchart. The method 400 start at block 402. As discussed above, several input/output devices may be used in association with the system of the present disclosure, including a mouse, keyboard, VR headset, touch input, e.g., on a touchscreen, and other forms of input/output devices known to a person having ordinary skill in the art. When user input action has been detected, as provided in block 402, the method 400 determines if the user input action intersects with a voxel, discussed further below, as provided with query block 406. For example, if a mouse is used, the method determines if the virtual position of the mouse's signal in the VIC 106 intersects with a voxel. Various techniques such as bounding box, and other methods known to a person having ordinary skill in the art can be used in order to make the determination in the query block 406 as to whether there has been a collision. If no collision is detected, the method returns to the user input action block 404 awaiting the next such detection. If the answer is yes, data is collected as relates to the user input action, as provided in block 408.

Block 410 represents the data collection, storage, and organization into an octree in preparation for access and modification. This ensures that real-time changes can easily be monitored according to block 412. The states being monitored sends the updates to the voxels to ensure the environment reflects the user input actions, as provided in block 414. These voxel states than trigger specific events that affect the VIC. For example, an event that triggers a component to highlight in the virtual environment, as provided by block 416. The triggered event also generates feedback that helps give an immediate response to the actions performed by the user in the framework in real-time, as provided by block 418. This feedback lets the user know what they are doing and helps users to track their maintain engagement and track their progress. Data is logged into a database, as provided in block 420. The method 400 ends at block 422.

Figure 5:
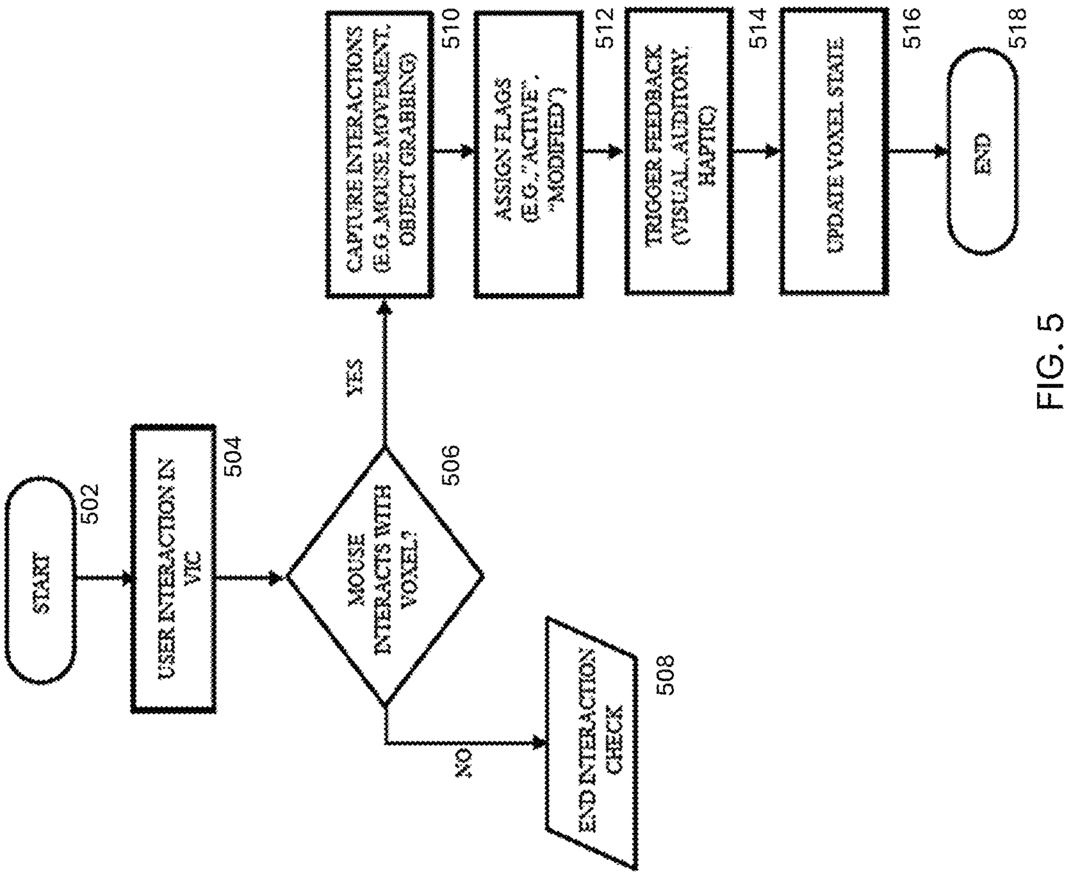
FIG. 5 is a flowchart describing a method related to user input, according to the present disclosure.

Referring to FIG. 5, a method 500 related to user input is provided. The method 500 starts at block 502, then proceeds to detecting a user interaction in VIC 106 based on an input signal from an input device such as a mouse, as provided in block 504. As discussed above, method 500 determines if the virtual position of the mouse signal interacts with a voxel, as provided in block 506. As discussed above, various techniques such as bounding box, and other methods known to a person having ordinary skill in the art can be used in order to make the determination in the query block 506 as to whether there has been a collision (i.e., interaction with a voxel). If no interaction, signifying an errant signal from the input device, the interaction check is ended, as provided in block 508. If an interaction is detected, method 500 determines the nature of interaction, for example did the trainee 102 grab an object by way of manipulating the input device, as provided in block 510. This user interaction data is categorized and flagged as follows: Active means interaction is taking place; Modified means interaction has led to some alteration of the environment and objects; and Inactive means interaction is not in progress, as outlined in block 512. Based on the category, feedback is triggered to reflect the actions performed by the user and provide immediate responses. For example, this feedback can include changes to the color of a component, sound effects when a user picks up a component, and haptic feedback vibrations when a user is handling a component, as provided in block 514. These changes are then incorporated into the voxel state so that the virtual environment is in sync with the interaction feedback as provided in block 516. The method 500 ends in block 518.

Figure 6:
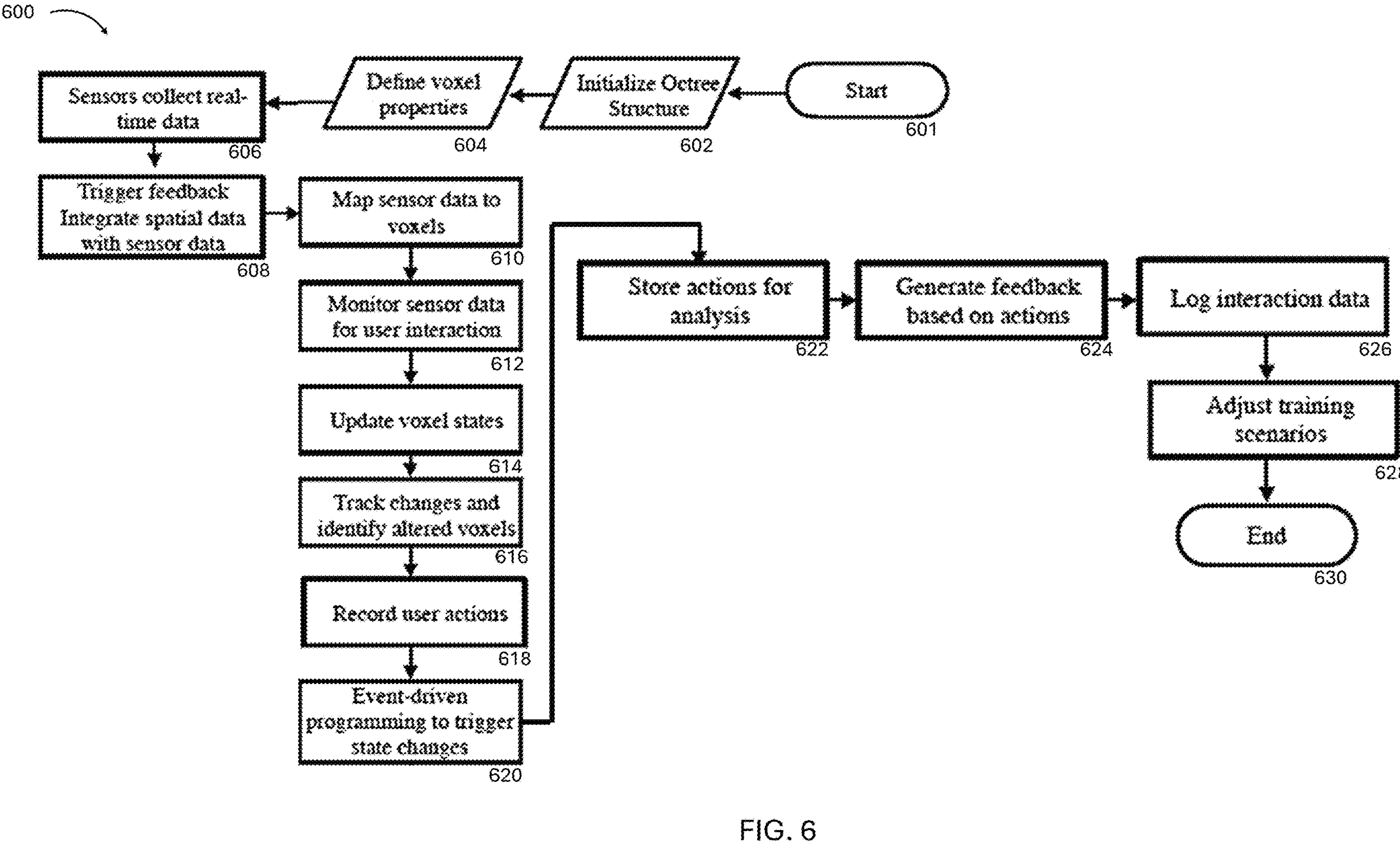
FIG. 6 is a flowchart describing a method related to formation of an octree and voxels within the octree, according to the present disclosure.

Referring to FIG. 6, a method 600 is shown related to formation of the octree and voxels within the octree. The method begins at block 601. At block 602, each voxel within the octree is initialized. Next, properties of each voxel is defined, as provided by block 604. For example, the sensorized voxels have different properties, e.g., making them sensitive with virtual proximity sensors. Next the system collects data from input/output devices as well as sensors of the sensorized voxels, as provided by block 606. When input/output devices sensors indicate a collision with sensorized voxels, feedback is triggered, as provided by block 608. Thus, a mapping of input/output device sensor data and voxel data is generated, as provided by block 610. Throughout, sensor data from the input/output devices is monitored to determine user interaction, as provided by block 612. When a change is determined in the state of the VIC, the voxel states are updated, as provided by block 614. By determining which voxels are affected, the change in state of VIC is tracked, as provided by block 616. At the same time, user inputs are recorded into a database, as provided by block 618. Based on the inputs provided by the user, an event-driven programming is used to trigger state changes of the VIC, as provided by block 620. With the new state of the VIC, user's actions are recorded in the database, for analysis of whether the user's actions were correct, incorrect, or to what extent incorrect, as provided by block 622. Real-time feedback is generated based on the analysis and the user's inputs, as provided by block 624. Next, interaction data is stored in the database for future reference by the system, as provided by block 626. The system then adjusts the next training module based on the analysis, as provided by block 628. The method 600 ends at block 630.

Figure 7:
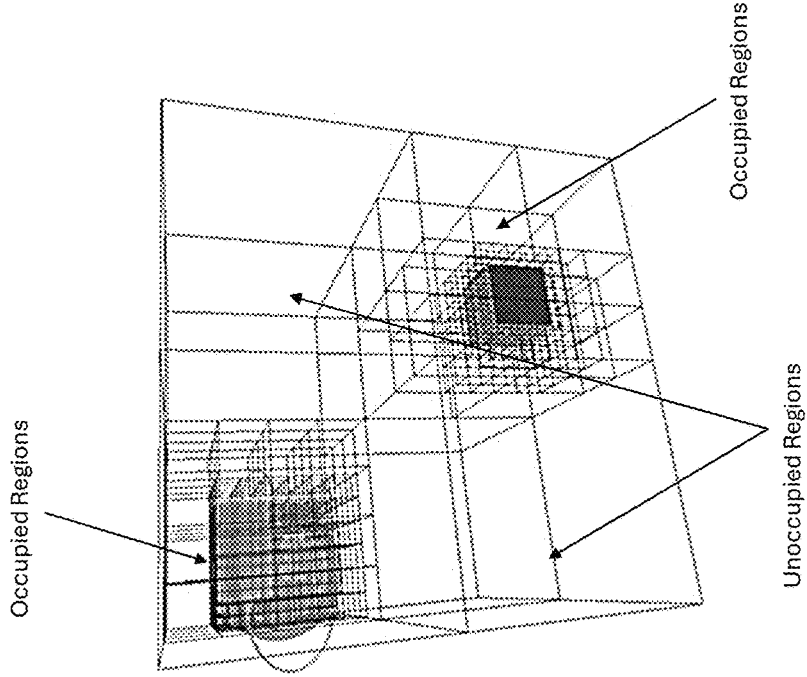
FIG. 7 provides schematics for visualization of the octree and voxels along with a recursive subdivision of each node into eight additional voxels, according to the present disclosure.
Figure 7:
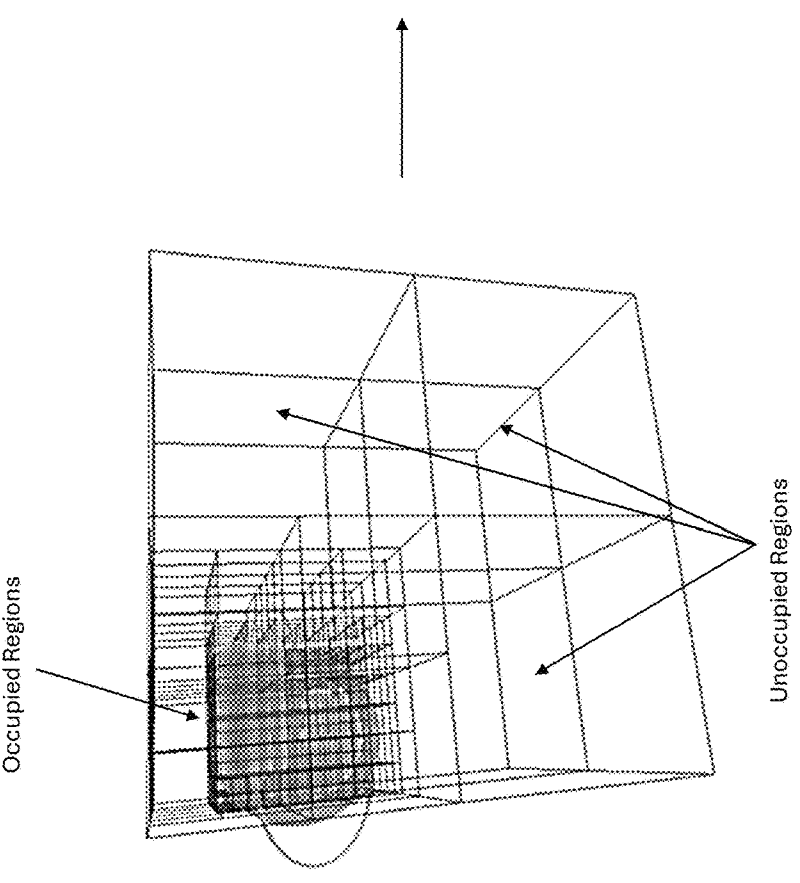

Referring to FIG. 7, visualization of the octree and voxels is provided along with a recursive subdivision of each node into eight additional voxels. The illustration shows a 3D space divided into an octree structure. In this structure, nodes represent spatial data within the voxel grid. For example, the empty cube under component 1 has no nodes (shown on the right), indicating it is unoccupied. On the left, the illustration shows two objects within the octree, indicating two occupied regions. If these objects are moved, sensors within the voxels, defined by their bounding boxes, detect user interactions such as movement.

Figure 8:
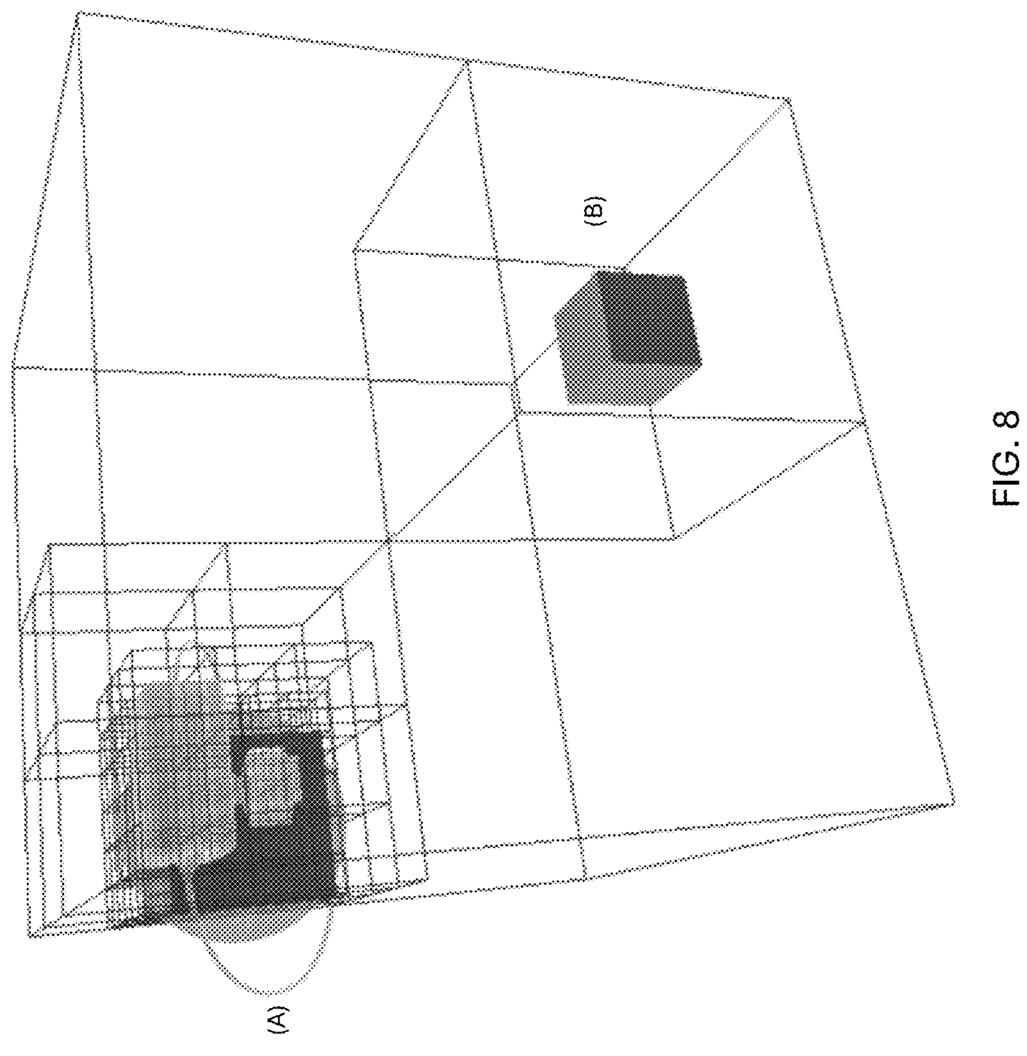
FIG. 8 is a schematic of level of detail (LOD), according to the present disclosure.

Referring to FIG. 8, a schematic of level of detail (LOD) is shown. In VIC, the LOD subsystem ensures that only the objects crucial to the scene are rendered. Objects deemed irrelevant based on their LOD are excluded from rendering, meaning no data is captured for these objects, and that portion of the space is effectively left empty. This approach optimizes scene rendering and performance by processing only the necessary visual data. For example, in case (A), a high-LOD component and its surrounding nodes are recorded and rendered because they are important for the scene. However, in case (B), objects are marked with a low-LOD, meaning they are not deemed relevant and therefore excluded from rendering. As a result, even if an object is present in that space, it will not be rendered or processed, and it can be dynamically removed if needed. This enhances the performance efficiency of the overall system and avoids over-burdening the processor so that there is no lag (delay) in the real-time interactive feedback and virtual scene generation. Interaction delays significantly reduce the overall user experience and engagement, and hence, the LOD mechanism described here is critical innovative aspect for promoting a robust virtual training framework.

Figure 9:
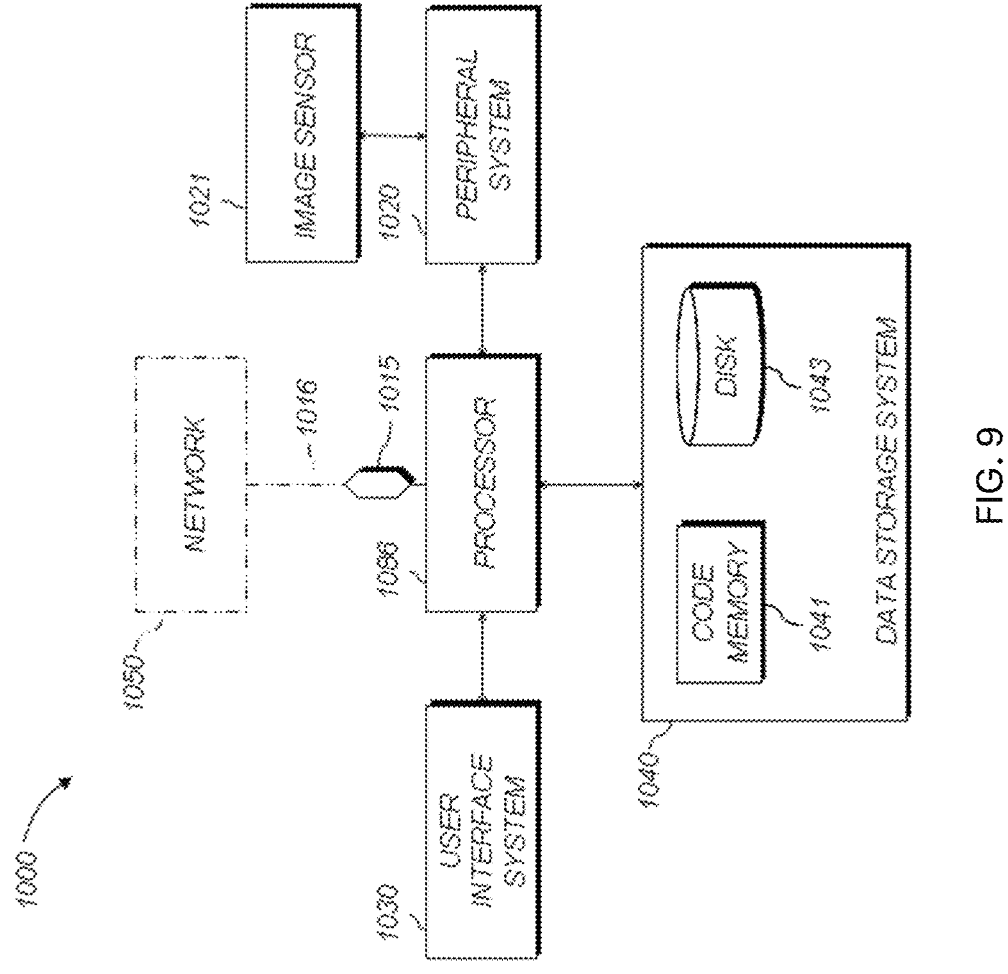
FIG. 9 is a block diagram of a computer system that can interface with the system of the present disclosure.

Referring to FIG. 9 a block diagram of a computer system is provided that can interface with the system of the present disclosure. As discussed throughout the present disclosure, a processor and an associated computer system executing instructions maintained in a non-transitory memory is used to carry out the methods of the present disclosure. Referring to FIG. 9, an example of a such a computer system is provided that can interface with the above-discussed system. Referring to FIG. 9, a high-level diagram showing the components of an exemplary data-processing system 1000 for analyzing data and performing tasks described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, a touchpad, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

It should be appreciated that most of the selections, inputs, etc. are done in a virtual environment. Other than actual inputs provided by input devices, almost everything else in the present disclosure is conducted virtually. Thus, when a new scene is presented, the scene is a virtual based on a virtual construction.

Those having ordinary skill in the art will recognize that numerous modifications can be made to the specific implementations described above. The implementations should not be limited to the particular limitations described. Other implementations may be possible.

The invention claimed is:

1. A method of providing training in a virtual reality training room for training a trainee, comprising:

presenting to a trainee a virtual training projection (VIC), the VIC includes a virtual robot (VOB) that is configured to guide the trainee in the virtual training; and executing instructions maintained on a non-transitory memory by a processor to:

rendering a virtual reality training room scene that includes a specialized processing equipment (SPE) on which to train the trainee, presenting to the trainee an introduction to the VIC, and presenting to the trainee one or more modules associated with operation or assembly of the SPE, for each module:

STEP A: presenting a step-by-step initial set of instructions constituting one or more submodules for operating or assembling the SPE, organized by the VOB, STEP (B): at the end of each submodule, requesting the trainee to repeat the steps covered in said submodule, receiving inputs from the trainee via an input device, the inputs representing the trainee's virtual actions in repeating the step-by-step instructions, using the trainee's received inputs, constructing a trainee action including timing of the action and virtual location of the action and comparing the trainee action with an expected action, if the trainee action is within the expected action by a predetermined threshold, proceeding to the next submodule (Step A), and if the trainee action is different from the expected action by the predetermined threshold, generating an error signal, and real-time customizing and rendering a new training for said submodule and presenting the new customized rendering to the trainee (STEP B), wherein the step of constructing the trainee action includes establishing a virtual 3-dimensional (3D) space using an octree having a plurality of voxels with one or more voxels of the plurality of voxels being sensorized voxels which is configured to provide a proximity signal when the constructed virtual position via the input device indicates proximity to said sensorized voxels within a predetermined distance threshold.

2. The method of claim 1, wherein the VIC is presented to the trainee by one or more of computer screen, a tablet, a monitor, or a projection on a screen.

3. The method of claim 1, wherein the input device is one or more of a mouse, a handheld controller, a virtual reality goggle, a touchpad, or a keyboard.

4. The method of claim 1, further comprising providing a status indicator to indicate status of the training based on progression of the one or more modules.

5. The method of claim 1, wherein the step of real-time customizing and rendering a new training includes varying the step-by-step instructions in each submodule.

6. The method of claim 5, wherein the variation of the step-by-step instructions in each submodule includes skipping one or more of the step-by-step instructions.

7. The method of claim 5, wherein the variation of the step-by-step instructions in each submodule includes speeding up time between each of the step-by-step instructions.

8. The method of claim 5, wherein the variation of the step-by-step instructions in each submodule includes slowing down time between each of the step-by-step instructions.

9. The method of claim 5, wherein the variation of the step-by-step instructions in each submodule includes real-time adding a new step in the step-by-step instructions.

10. A virtual reality system for providing training in a virtual reality training room for training a trainee, comprising:

one or more rendering devices configured to display a virtual training projection (VIC), the VIC includes a virtual robot (VOB) that is configured to guide the trainee in the virtual training; and one or more input devices configured to provide inputs from the trainee; and a processing system having a processor configured to execute instructions maintained on a non-transitory memory, the processor configured to:

render a virtual reality training room scene that includes a specialized processing equipment (SPE) on which to train the trainee, present to the trainee an introduction to the VIC, and present to the trainee one or more modules associated with operation or assembly of the SPE, for each module:

STEP A: present a step-by-step initial set of instructions constituting one or more submodules for operating or assembling the SPE, organized by the VOB, STEP (B): at the end of each submodule, request the trainee to repeat the steps covered in said submodule, receive inputs from the trainee via the one or more input devices, the inputs representing the trainee's virtual actions in repeating the step-by-step instructions, using the trainee's received inputs, construct a trainee action including timing of the trainee action and virtual location of the trainee action and comparing the trainee action with an expected action, if the trainee action is within the expected action by a predetermined threshold, proceed to the next submodule (Step A), and if the trainee's action is different from the expected action by the predetermined threshold, generate an error signal, and real-time customize and render a new training for said submodule and presenting the new customized rendering to the trainee (STEP B), wherein the processor is configured to construct the trainee action based on establishing a virtual 3-dimensional (3D) space using an octree having a plurality of voxels with one or more voxels of the plurality of voxels being sensorized voxels which are configured to provide a proximity signal when the constructed virtual position via the input device indicates proximity to said sensorized voxels within a predetermined distance threshold.

11. The system of claim 10, wherein the VIC is presented to the trainee by one or more of computer screen, a tablet, a monitor, or a projection on a screen.

12. The system of claim 10, wherein the input device is one or more of a mouse, a handheld controller, a virtual reality goggle, a touchpad, or a keyboard.

13. The system of claim 10, further comprising providing a status indicator to indicate status of the training based on progression of the one or more modules.

14. The system of claim 10, wherein the step of real-time customizing and rendering a new training includes varying the step-by-step instructions in each submodule.

15. The system of claim 14, wherein the variation of the step-by-step instructions in each submodule includes skipping one or more of the step-by-step instructions.

16. The system of claim 14, wherein the variation of the step-by-step instructions in each submodule includes speeding up time between each of the step-by-step instructions.

17. The system of claim 14, wherein the variation of the step-by-step instructions in each submodule includes slowing down time between each of the step-by-step instructions.

18. The system of claim 14, wherein the variation of the step-by-step instructions in each submodule includes real-time adding a new step in the step-by-step instructions.

* * * * *